United States Patent [19]

Lulay et al.

[11] Patent Number: 4,588,291
[45] Date of Patent: May 13, 1986

[54] METHOD OF MANUFACTURE OF PRINTING PLATES FROM PREPARED COPY

[75] Inventors: Lawrence O. Lulay, Peoria; Steven F. Nichols, Pekin, both of Ill.

[73] Assignee: C & H Printing, Inc., Peoria, Ill.

[21] Appl. No.: 671,008

[22] Filed: Nov. 13, 1984

[51] Int. Cl.⁴ .............................................. G03B 27/32
[52] U.S. Cl. .......................................... 355/77; 355/75
[58] Field of Search ..................................... 355/75, 77

[56] References Cited

U.S. PATENT DOCUMENTS

| | | | |
|---|---|---|---|
| 3,721,173 | 3/1973 | Jaffe | 355/75 |
| 3,935,583 | 1/1976 | Spence-Bate | 355/75 |
| 4,028,107 | 6/1977 | Henley | 355/75 |
| 4,055,381 | 10/1977 | Lauer et al. | 355/75 |
| 4,118,120 | 10/1978 | Ruffner et al. | 355/75 |
| 4,493,552 | 1/1985 | Walsh | 355/75 |

*Primary Examiner*—Monroe H. Hayes
*Attorney, Agent, or Firm*—Allegretti, Newitt, Witcoff & McAndrews, Ltd.

[57] ABSTRACT

Camera ready copy is prepared for each page of a publication. Each page of the camera ready copy is then affixed in an appropriate manner to a special control sheet. The control sheets which are to be used are dependent upon the particular signature size and configuration. The control sheets are specially coded to identify the page of copy and also specially configured to facilitate placement of copy and to provide a means for indexing and orienting the control sheet during the process. After each page of camera ready copy is mounted on a corresponding, appropriate control sheet, predetermined sets of control sheets are then positioned on a platen associated with a photo negative apparatus. A photograph is taken of the copy on those sheets. The fully developed negative represents a signature or a portion of a signature wherein the camera ready copy has been photographed and prealigned in such a manner that the negative itself is substantially ready for a printing plate.

5 Claims, 17 Drawing Figures

METHOD OF MANUFACTURE OF PRINTING PLATES FROM PREPARED COPY

BACKGROUND OF THE INVENTION

This invention relates to an improved method for manufacture of printing plates, such as offset printing plates, by use of photo mechanical plate making techniques. More particularly, this invention relates to a method for manufacture of printing plates used to simultaneously print a multiple number of pages associated with a signature. The invention further relates to a method for preparing a photographic negative from which the printing plates are made. The invention thus constitutes an efficient manner to more quickly and more easily arrange and make such photographic negatives used in the manufacture of printing plates.

A multiple page printed sheet having a predetermined number of pages arranged in serial order after folding the sheet is known as a signature. Before the sheet is folded it is known as the signature sheet.

Typically, the opposite sides of printed signature sheet are printed with multiple pages of copy. There may, for example, be anywhere from 2 to 64 pages on each side of a signature sheet depending, for example, upon the size of the page. Each printed signature sheet is then cut and folded in an appropriate manner to provide signatures which may be bound together to form the book or magazine. The particular geometrical arrangement of a printed signature sheet for each size signature can be determined and is well known to those skilled in the art depending upon the printing process, the size of the page, the size of the signature and the number of signatures; for example, see pages 97–104 of "Pocket Pal—a graphic arts production hand book", Thirteenth Edition, May 1983, International Paper Company.

In order to make printing plates that are used to prepare a printed signature sheet for a multiple page signature, various plate making techniques may be used particularly with respect to lithographic printing, gravure printing, and letter press printing. To make printing plates using photo mechanical plate making techniques, it is necessary to initially prepare a photographic negative or films which may be used in the plate making apparatus for the manufacture of the printing plate. Thus, film is prepared which replicates all or a portion of one side of a sheet for the signature. The film, in turn, is used to prepare a printing plate using some type of photo mechanical technique.

As a first step when preparing the film, it is necessary to prepare a layout of each page of the copy. The layout is then photographed. For example, when preparing a four page signature, each page of copy may be individually photographed. The photograph or film for each page is then trimmed and properly arranged on a backing or support known as a signature mounting sheet. Alternatively, a number of pages of copy may be simultaneously photographed. The pages are then separately cut from the film and the film for each page is trimmed and properly positioned on a signature mounting sheet also known as a masking sheet.

A great deal of effort and time is necessary in order to properly trim and align the pages of film on the signature mounting sheet or masking sheet. Any changes or modifications of the film copy must be made on the signature mounting sheet. Ultimately, a composite negative film is made or formed by the artisan. That film contains an image of all of the pages necessary to make a printing plate used for printing one side of a signature sheet.

Thus, after the negative or film is, in effect, put together on the signature mounting sheet by a skilled artisan, it may then be placed in the plate making machine to create a printing plate by photo mechanical procedures. A need remains, therefore, to devise a method by which a signature negative or film can be prepared without requiring assembly of a composite negative or film on a signature mounting sheet.

SUMMARY OF THE INVENTION

To practice the present invention, camera ready copy is prepared for each page of the publication. The camera ready copy, in essence, constitutes an original of the book, magazine or other publication which is to be prepared and is a total assembly and arrangement of appropriately numbered pages in serial order. Each page of the camera ready copy is then affixed in an appropriate manner to a special control sheet.

The control sheets are then divided into sets according to the arrangement of signatures comprising the work. That is, the work will comprise a known, even number of pages. The pages are divided into one or more signatures or fractions thereof, depending upon signature size. Thus, once the signature size and number of pages are known, and the pages are mounted on the special control sheets, it is possible to divide the control sheets into signature size sets. The control sheets in each set are determined by reference to a special table. The control sheets are specially coded to identify the page of copy and also specially configured to facilitate placement of copy and to provide a means for indexing.

After each page of camera ready copy is mounted on a corresponding, appropriate control sheet and the control sheets are divided into proper sets, the sets of control sheets are positioned on a platen associated with a photo negative or film making apparatus. The platen includes means for mounting and orienting the control sheets in a proper sequence to be photographed for creation of a film negative. Thus, a set of the control sheets is positioned on the platen. A photograph is taken of those sheets to make a film. The process is repeated until all of the films required for a signature are fully exposed and developed.

The negatives or film represent a signature or a portion of a signature wherein the camera ready copy has been photographed and prealigned in such a manner that the films themselves are substantially ready for the photo mechanical plate making step. In other words, once the camera ready copy is photographed, the negatives or films created by this process are available with a minimum of further work, if any work at all, for preparing the photo mechanical printing plate.

Thus, it is an object of the invention to provide an improved process for the manufacture of films useful for making a photo mechanical printing plate.

It is a further object of the invention to provide an improved process of manufacture of photo mechanical printing plates.

Still another object of the invention is to provide a process for the manufacture of printing plates wherein camera ready copy may be easily photographed and incorporated in a composite negative film which is used for the manufacture of a photo mechanical printing plate.

Still another object of the invention is to provide a process for the preparation of photo mechanical printing plates which is less time consuming and equally accurate, if not more accurate, than prior art processes.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

In General

Figure 1:
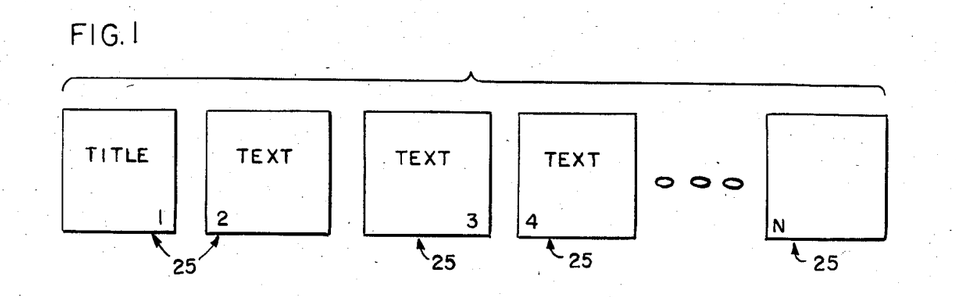
FIG. 1 is a schematic view of page ready copy for a work with the pages arranged in serial order.

FIGS. 1-9 depict the invention in general. FIGS. 10-17 relate to a specific embodiment of the invention for an eight page signature. FIG. 1 illustrates the first or initial step in the preparation of a magazine, book or other multipage publication incorporating the process or steps of the present invention. Initially, positive camera ready copy is provided for each page 1, 2, ... N of the series of pages defining the publication. Page N is normally an even numbered page and for purposes of further description will be considered an even numbered page even if it is blank. Typically the camera ready copy would be provided by a client. For example, the client could provide a catalog having a multiple number of pages. Each catalog page would be prepared in final form on a separate sheet and arranged in serial order so that appropriate paging numbers 1, 2, ... N may be placed on each of the camera ready copy pages 25 in FIG. 1. For example, a 16 page catalog, including the front and back cover, defines a series of 16 pages for which camera ready copy, i.e. a copy of each numbered page 1 through 16 is required.

Figure 2:
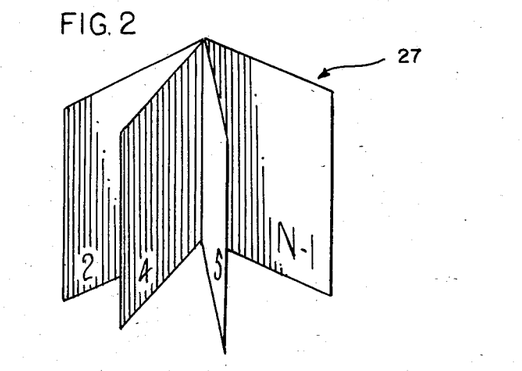
FIG. 2 is a schematic view illustrating the manner by which the pages shown in FIG. 1 may be assembled to form a signature for binding to provide the magazine or book.

Once such camera ready copy pages 25 of the work are available, one can determine the signature size, arrangement and form to be associated with the work. Again, using the example of a 16 page catalog, it is known that when making a 16 page signature, half of the pages (eight pages) may be printed on one side of a large, single signature sheet in a specific geometric array and orientation, and the remaining eight pages may be printed on the opposite side of the signature sheet, again in a specific orientation. In this manner the printed sheet having eight pages printed on each side may be appropriately cut and folded and ultimately bound in order to provide a 16 page booklet or "signature". FIG. 2 is a perspective view of a signature 27 having N pages.

Alternatively, a 16 page work may comprise four signatures of four pages each; or two signatures of eight pages each. The printer must therefore make a decision as to the particular arrangement of signatures; namely, how many and how are they to be arranged? This decision is dependent upon factors such as number of pages in the completed work, page size, number of colors to be printed, press capability, and others as known to those of ordinary skill in the art.

After a determination is made concerning the arrangement and composition of the signatures needed for the work, the printer can commence making of plates for printing the signatures. As the next step in the process of the present invention, control sheets 30, 32 are prepared in accordance with the desired signature arrangement. That is, referring to FIGS. 3 and 4, there are illustrated two types of control sheets 30, 32. The first type of control sheet 30 is designed for use with odd numbered pages. The second type of control sheet 32 is designed for use with even numbered pages. These control sheets 30, 32 are used for mounting and then orienting and otherwise arranging in proper sequence and order the various copy pages 25 associated with the signature 27 which is being prepared. Each control sheet 30 and 32 is precoded, for example, by marking or punching indicia on the sheets to facilitate appropriate further use throughout the remainder of the process. Precoding as by prepunching is dependent, inter alia, upon the signature size, number of pages, pages per photographic plate, the photo negative capacity, and whether the pages are even or odd numbered pages.

Figure 3:
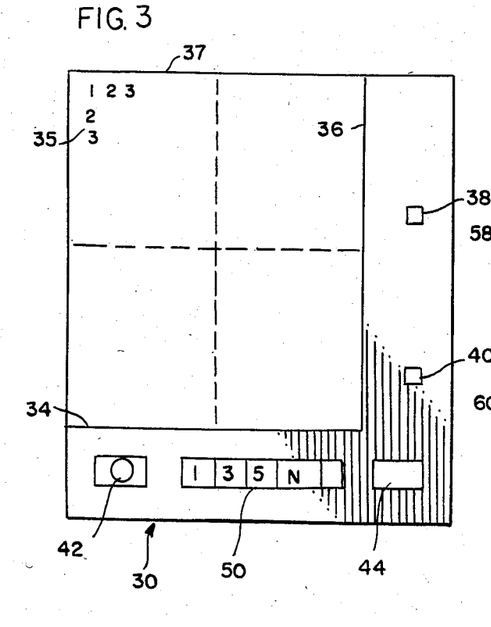
FIG. 3 is a plan view of a control sheet associated with odd numbered pages which are to be used as camera ready copy in the preparation of a film negative.
Figure 4:
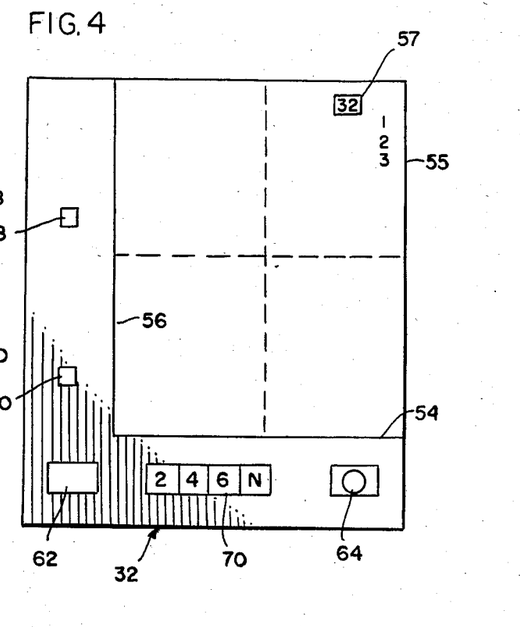
FIG. 4 is a plan view of a control sheet associated with even numbered pages.

FIG. 3 depicts the first type control sheet 30; namely, that sheet associated with odd numbered pages. FIG. 4 depicts the second type control sheet 32; namely, that sheet used for the even numbered pages. Referring to FIG. 3, control sheet 30 includes alignment indicia 34, 35, 36 and 37 which serve to properly align the corresponding even numbered camera ready copy page 25 mounted on the control sheet 30. The camera ready copy page 25 is thus attached to the appropriate control sheet 30. Prepunched openings 38 and 40 are provided on the sheets 30 for cooperation with sheet mounting pins as discussed in greater detail below.

The particular page 25 associated with the camera ready copy is then identified by a code, i.e. a color code and a page number legend. Two color code boxes 42, 44 are provided. As an example, code box 42 is red. Code box 44 is blue. The color code boxes 42, 44 are used to identify and locate the placement of page copy during a later photographic step in the process. Only one of the two control code boxes 42, 44 is activated, for example, by punching a hole therethrough to provide a position code for the control sheet 30. An odd page number indicia legend box 50 is also provided on the control sheet 30. For indicating the page of copy 25, i.e. page "1", "3", etc., the particular camera ready page 25 for which the control sheet 30 is coded is thus indicated on the page number box 50 by punching an opening at the proper number of box 50 on the sheet 30, e.g. odd number "3" may be punched or marked for copy page "3".

The even numbered page control sheet 32 of FIG. 4 is similarly constructed. It includes alignment indicia 54, 55, 56, 57 for aligning page copy 25 on sheet 32; a green color code box 62 and a yellow color code box 64; and a page number box 70 indicating even numbered pages, i.e. "2", "4", etc. Mounting openings 58, 60 are also provided. Sheet 32 provides for positioning copy in the upper right hand corner. This is contrasted with positioning of odd numbered pages in the upper left hand page of sheet 30. The color code boxes 62, 64 and number box 70 are distinct from their counterparts on sheet 30.

Figure 10:
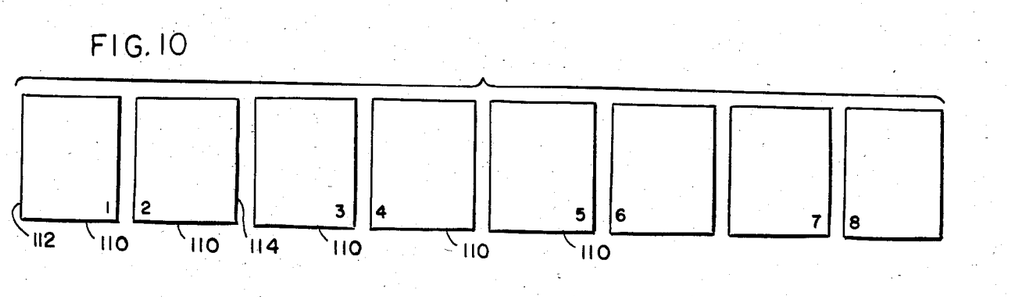
FIG. 10 is a chart used to determine the sequence and arrangement of control sheets for the eight page signature of FIG. 8.

Once an appropriate camera ready copy page 25 is properly mounted on its appropriate precoded and prenumbered control sheet 30 or 32, the series of control sheets 30, 32 must be collated for use in the photographic step of the process. To properly collate the control sheets 30, 32, reference is made to an indexing table prepared in accordance with the invention. FIG. 10 illustrates one such table useful for eight page signatures wherein the work and turn pages are placed at the front of the signatures.

Figure 9:
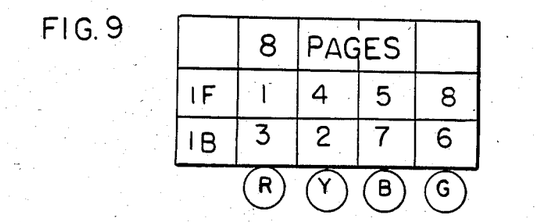
FIG. 9 is a plan view of the copy for an eight page signature.
Figure 17:
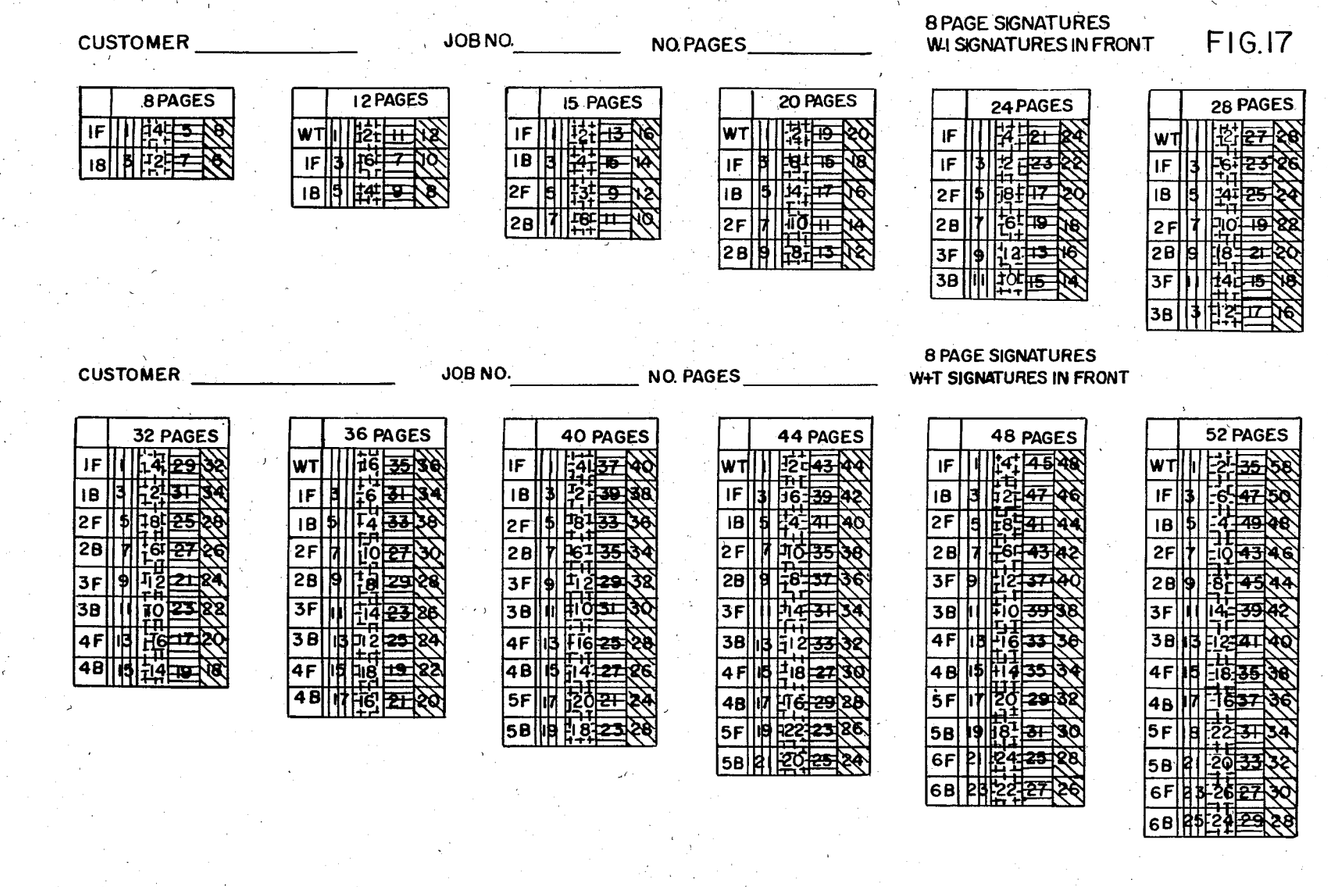
FIG. 17 is a series of tables useful for preparing and arranging copy on control sheets in proper order and sequence in accordance with signature size and printing procedure.

Specifically, the control sheets 30, 32 are arranged in sets and sequences in accordance with the appropriate table, e.g. FIG. 9. For example, an eight page signature will comprise a first set of control sheets 30, 32 forming the front (set 1F) of the printed signature sheet. The first set will include pages "1", "4", "5" and "8" of the signature (indicated by the entries on line "1F") having the associated respective control colors: red, yellow, blue and green. The colors are indicated at the bottom of each column in FIG. 9 by the letters "R", "Y", "B" and "G", respectively. Alternatively, the columns may be printed in the appropriate color code as depicted by FIG. 17.

In any event, on the odd numbered sheet 30 as prepared for page "1", the red code box 42 will be indicated, e.g. by a punched opening. Also, the page number box 50 will indicate page "1", e.g. by a punched opening. Similarly, the page "4" control sheet 32 will have yellow code box 64 and the page number box 70 at page "4" indicated, e.g. by a punched opening.

Similarly, referring to the table of FIG. 10, the remaining control sheets 30, 32 will form a second set comprised of pages 3, 2, 7 and 6 having respective color codes: red, yellow, blue and green. The second set defines the film and plate for the back printed side of the eight page signature sheet (1B).

Once arranged in appropriate sets, e.g. sets "1F" and "1B", the control sheets 30, 32 of each separate set, i.e. first set "1F", then set "1B", are positioned on a platen 75 associated with a camera 77 for the manufacture of a photo negative or film. The sheets 30, 32 are positioned in accordance with the precoded information in boxes 42, 44, 50, 62, 64, 70 and held by the alignment openings 38, 40, 58, 60 of the sheets 30, 32 that are provided for cooperation with alignment pins 78, 80, 84, 86 on the platen 75. To facilitate positioning of the sheets 30, 32, the platen 75 includes color code boxes 82. Thus, the color code box or block 82 of the platen 75 is matched with the punched or marked color code box 42, 44 of sheet 30 or 62, 64 of sheet 32. As will be appreciated, prepunching or marking of one of the color code boxes 42, 44 is associated with the orientation of the control sheet 30 on the platen and is related to the position of the page on a photographic negative as well as on a final printed signature sheet. Thus, the color coding relationship of the sheets 30, 32 to the platen 75 is dependent upon the page number and signature size, all of which are predetermined and premarked in accordance with a control table, e.g. the table of FIG. 9.

Figure 5:
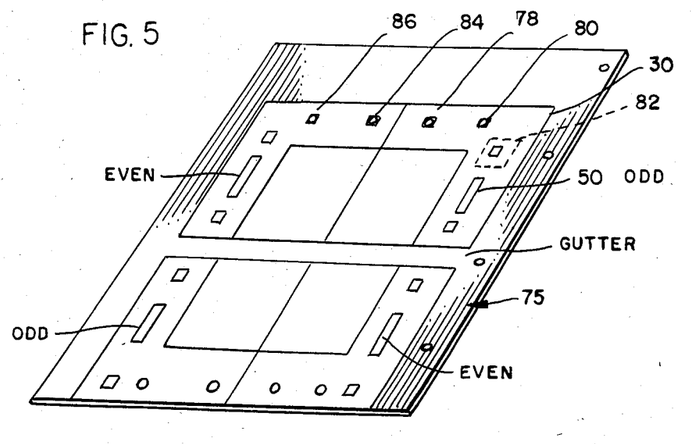
FIG. 5 is a schematic illustration of the manner in which the control sheets having the camera ready copy mounted thereon are attached and positioned on a photographic platen associated with apparatus for the manufacture of photographic negatives.

Normally a set of four control sheets 30, 32 having the camera ready copy pages 25 mounted thereon will be used to make a film negative, though different numbers of control sheets 30, 32 may comprise a set depending upon the size of the camera 77, the number of printed sheets involved and the like. In any event, the separate sets of control sheets 30, 32 are fitted on pins 78, 80, 84, 86 as depicted in FIG. 5 on the platen 75 in accordance with the coding procedure. The mounting pins 78, 82, 84, 86 are properly positioned on the platen 75 so that the control sheet 30, 32 are maintained at a proper focal length and position with respect to a negative image to be produced on a film 79 in camera 77. The film 79 is also held in a predetermined position in the camera 77 by pins 81 through openings 92, 94 in film 79 at a focal length which provides a sharp, properly sized image.

The image on the exposed and developed film 79 is a composite of all the page copy of a specific set of mounted control sheets 30, 32 on platen 75. FIG. 7 illustrates such a negative film 79 created by the step of FIG. 6. As shown in FIG. 7, the negative film 79 defines, for example, four pages of a signature. The pages are oriented relative to each other to provide an appropriate film negative for direct manufacture of a printing plate.

Thus, the negative image on film 79 represents a portion or all of the signature sheet that will be used for the preparation of a printing plate. This photo negative film 79 is substantially ready for making printing plates. No additional work such as the combining of separate pages to form a composite negative film need be performed.

Figure 8:
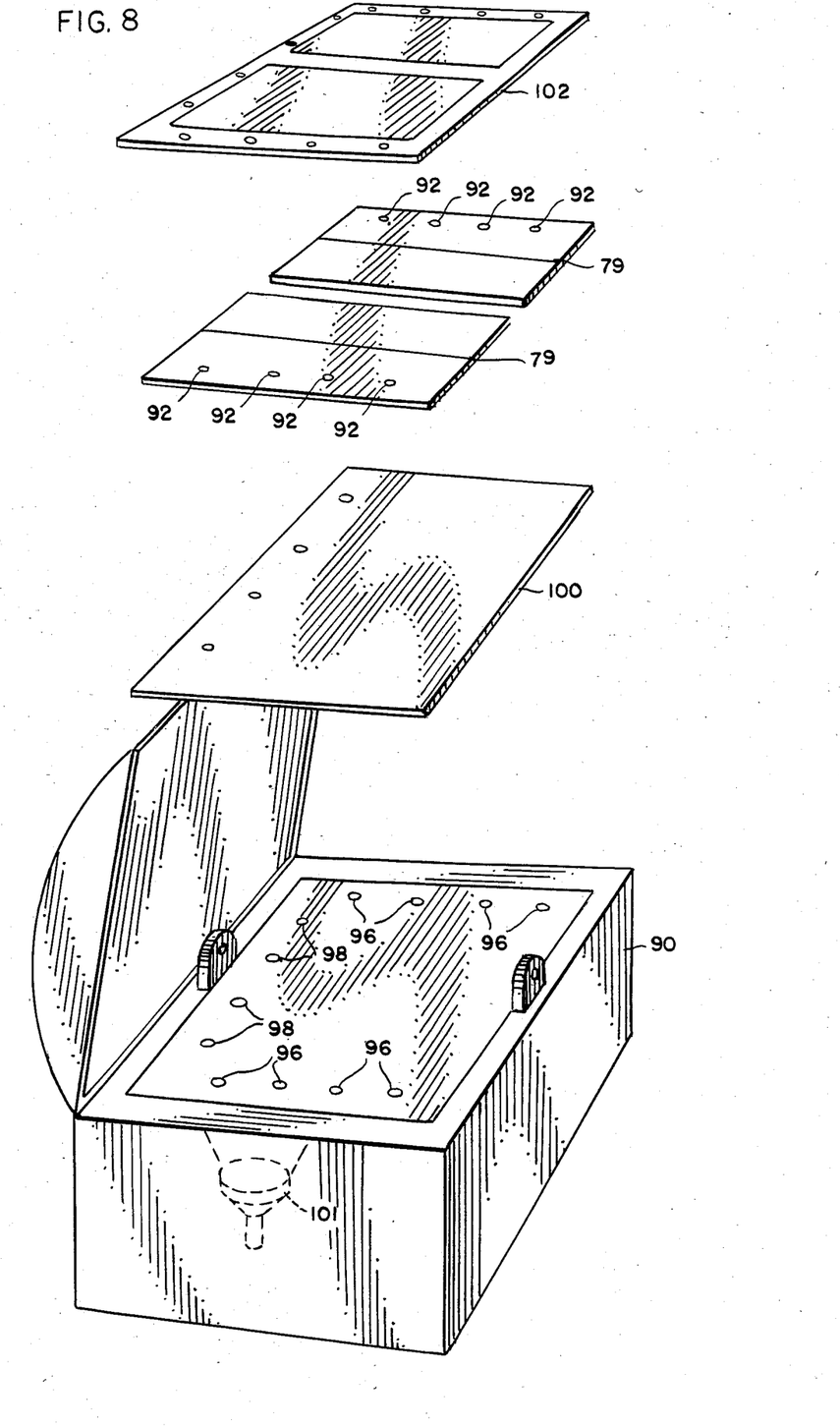
FIG. 8 is a perspective view of a typical photo making machine wherein the manufactured negative is positioned in the machine juxtaposed with respect to the light sensitive surface of a plate.

The negative film 79 is then positioned in a typical plate making machine 90 as illustrated in FIG. 8. That is, the negative film 79 includes openings 92 which cooperate with pins 96 in the plate making machine 90. Typically, a photo sensitive plate 100 is mounted on pins 98. The negative 79 is also placed over the pins 96 and thereby oriented properly with respect to the plate 100 and a light source 101. A mask 102 may be placed over the film 79 as desired. The mask 102 is also keyed to pins 96, 98 to insure proper orientation of film 79, plate 100 and mask 102. The printing process is then conducted in the normal manner and a printing plate 100 is ready for use on a press to make a signature or an appropriate part of a signature.

The description so far has been a general description with respect to the manner by which the present invention provides an improved method for the manufacture of printing plates and in particular the improved method for the manufacture of a negative film 79 which is used in the manufacture of printing plates. Following is a specific example of all the component parts used and the steps performed for a specific eight page signature referenced by way of example in this general description.

SPECIFIC EXAMPLE

FIGS. 10-17 depict a specific example for the making of printing plates for an eight page signature. Though such an example was suggested in the general description, the particular details associated with the making of such a signature will now be set forth.

Referring first to FIG. 10, a series of eight pages of copy are provided. These pages, one through eight, are numbered sequentially. With respect to the odd numbered pages, the number appears at the lower right hand corner. With respect to the even numbered pages, the number appears at the lower left hand corner. The numbers are positioned at the edge of the page opposite the center spine or binding of the work. For example, spine or center boundary line 112 of page one will be aligned with the spine or center boundary line 114 of page two.

Figure 11:
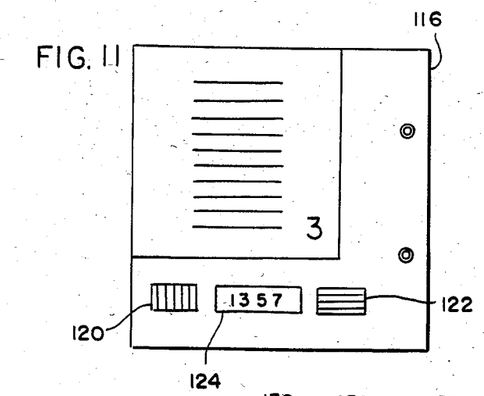
FIG. 11 is mounted copy for page 3 of the signature of FIG. 9.
Figure 12:
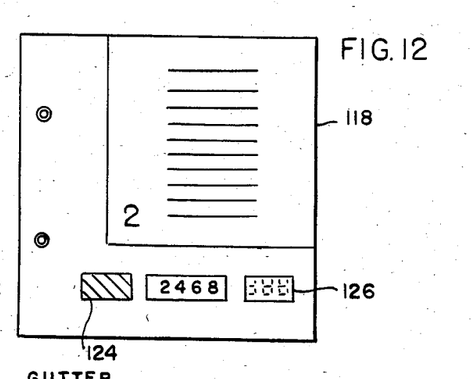
FIG. 12 is mounted copy for page 2 of the signature of FIG. 9.

Each single one of the pages depicted in FIG. 10 is then placed on a control sheet, i.e. odd page control sheet 116 in FIG. 11 or even page control sheet 118 in FIG. 12. Thus, odd numbered pages are placed on control sheets 116 as shown in FIG. 11. Even numbered pages are positioned on control sheets 118 as shown in FIG. 12. The odd numbered control sheets 116 receive pages in their upper left hand corner. Control sheets 118 for even numbered pages receive the pages in the upper right hand corner. Thus, the control sheets 116 and 118 are oversized along two margins relative to the pages of copy by at least approximately two inches. The odd numbered control sheets 116 include first and second platen positioning code boxes 120 and 122. The boxes 120 and 122 include a code color which correlates the page number of copy with the position of that page on the film which is to be used to make the printing plate. This correlation for the odd numbered pages as well as a similar correlation for the even numbered pages is set forth in the table depicted by FIG. 9 as well as the "8 page" table of FIG. 17.

Referring therefore to FIG. 9 or 17, there is set forth the table which is used to assist in the preparation of the control sheets 116 and 118 for each of the eight pages comprising the signature of FIG. 9. As shown in FIG. 9, a first set of control sheets 116, 118 will be comprised of the four control sheets for pages "1", "4", "5" and "8". This first set of control sheets will comprise the control sheets 116, 118 used to make the film or negative associated with the front of the printed eight page signature sheet and thus the associated printing plate for printing the front of the signature sheet. This is indicated by the nomenclature "1F". Each of the pages in the first set "1F" have associated therewith a particular color which is used to assist in positioning the control sheets 116, 118 properly during the film making operation. For example, page 1 is associated with the color red. Page 4 is associated with the color yellow. Page 5 is associated with the color blue. Page 8 is associated with the color green.

In the same manner, the film which is to be used to prepare the plate associated with the back side of the eight page signature sheet is likewise associated with a second set of pages designated "1B". Pages comprising the second set are pages "3", "2", "7" and "6". Note that the sum of the page numbers for each set (1F and 1B) is the number 18. This summation is an internal check on the correctness of the table in FIG. 10.

With respect to the second set "1B", each of the pages "3", "2", "7", "6" are also appropriately correlated with a color which again is associated with position of the page on the film that is to be made for use in ultimate manufacture of a plate. Thus, page 3 is associated with the color red. Page 2 is associated with the color yellow. Page 7 is associated with the color blue. Page 6 is associated with the color green.

After mounting each of the numbered pages on an appropriate control sheet 116 or 118, the control sheets 116, 118 are then marked preferably by punching openings through those sheets in a manner determined by reference to the signature set table of FIG. 10. For example, referring to FIG. 11, the control sheet 116 which is associated with the odd numbered page number, "3", is punched with an opening through the index block 120 which is red in color. Additionally, an opening is punched through the number box 124, for number "3" as an indication of the page.

Referring to FIG. 12, color code boxes 124, 126 are provided. The particular color of each of the boxes is also indicated on FIGS. 11 and 12 as red, blue, green and yellow. Of course, any combination of colors may be used. It is merely the purpose of the description to show the correlation between page numbers and page position with respect to the photographic images that are to be created. Thus, the yellow index block 126 is punched for page "2" since Table 10 indicates that page "2" is associated with the yellow color. Also, the number two is prepunched in the page box 128 of the control sheet 118. The various control sheets 116 and 118 are then arranged in the sets previously described as set 1F or set 1B, i.e., the first set and the second set.

Figure 13:
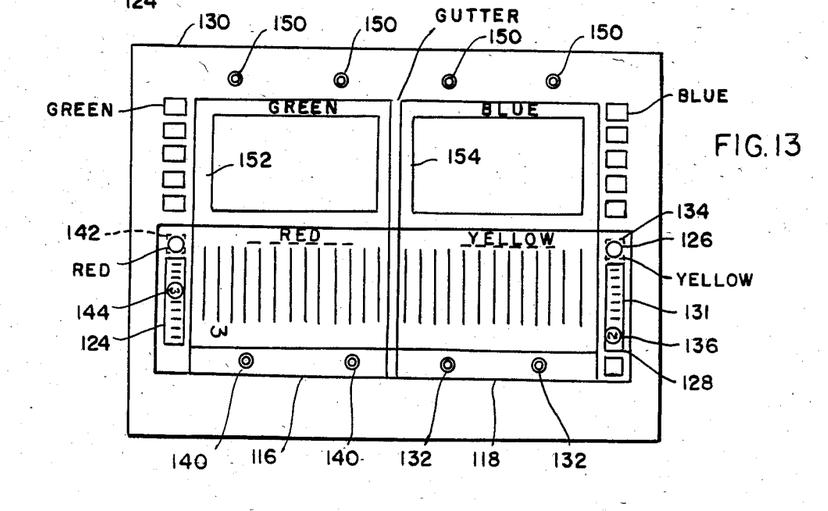
FIG. 13 is a plan view of the platen for mounting the control sheets and having two sheets mounted thereon.

The next step is represented by FIG. 13. Referring to FIG. 13, a platen 130 is provided for the mounting of the separate sets 1F or 1B. Beginning with the set "1B", control sheet 118 for page "2" is mounted on pins 132 so that the prepunched opening in box 126 which is the yellow color, fits over a yellow box 134 which is defined on the platen 130. Number box 128 of sheet 118 also overlays a number box 131 defined on the platen 130 so that the numeral "2" appears through an opening 136 punched in the number box 128 of control sheet 118. Sheet 118 for page "2" is thus precisely and accurately positioned on the platen 130.

In a similar fashion, the control sheet 116 associated with page "3" is positioned on pins 140. The proper correlation of the sheet 116 is indicated by the identification of the control code color through the punched opening of the box 120 of control sheet 116. Namely, the control color is provided in a box 142 which is inscribed on the platen 130. Additionally, the page number "3" is provided on the platen 130 and shows through the opening 144 in the control sheet 116 associated with box 124.

The other two pages, "7" and "6", which are mounted on their own respective control sheets and which are appropriately punched and identified with respect to their own color index boxes and page index boxes, are appropriately mounted on the remaining pins 150 defined in the platen 130. To further assist the operator in properly positioning the color coded control sheets on the platen, a color rectangle, for example, a green rectangle 152 or a blue rectangle 154, is provided. Matching of the rectangle with the code box 120, 122, 124 and 126 will help insure that the proper page is positioned properly on the platen 130.

Figure 6:
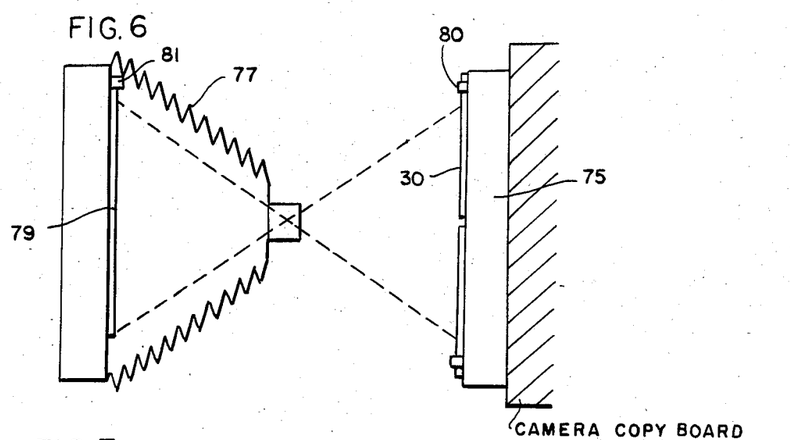
FIG. 6 is a diagrammatic side view of a camera for photographing material mounted on the platen of FIG. 5.
Figure 7:
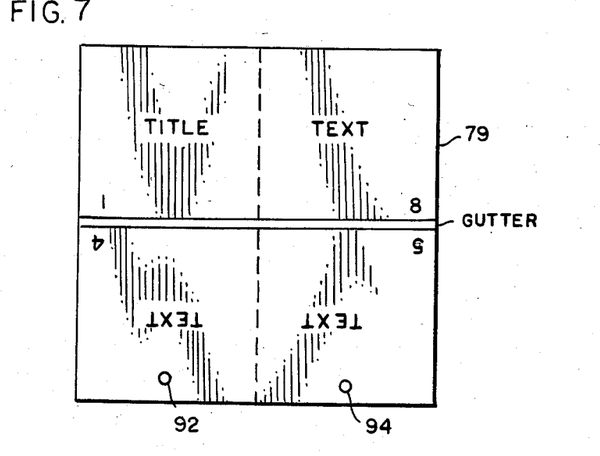
FIG. 7 is a plan view of a typical photo negative made using the apparatus of FIG. 6.
Figure 14:
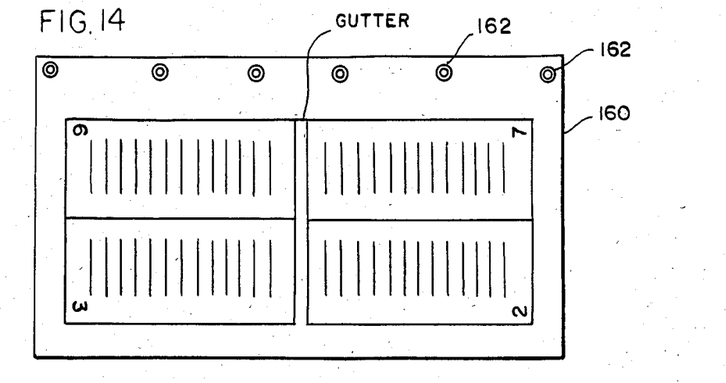
FIG. 14 is a plan view of the photo negative for the signature pages 2, 3, 6 and 7 of FIG. 9.

After all four pages of the set 1B are properly positioned on the platen 130, the platen 130 is positioned in the camera 77 in the manner previously described and depicted in FIG. 6 and a photograph is made of the copy which has been precisely positioned on the platen 130. As a result of the pre-indexing and prepositioning of all the copy material on the platen 130, a photo negative or film 160 as shown in FIG. 14 is provided. The photo negative 160 once developed is precisely and completely composed and immediately ready for manufacture of a printing plate with very little, if any, touch up or treatment.

That is, referring to FIG. 14, the film 160 as developed includes index openings 162 along one edge which properly position the film 160 in the camera 77 relative to the platen 130. The film 160 includes negative images of the four pages which define the second set (1B). That is, pages "2", "3", "6" and "7" as indicated on the drawing have their photographic images on the developed film 160. These photographic images, as previously explained, are properly and completely focused and aligned with respect to each other for manufacture of a printing plate in the plate machine such as known to those skilled in the art and depicted schmematically in FIG. 8 as well as in FIG. 15.

Figure 15:
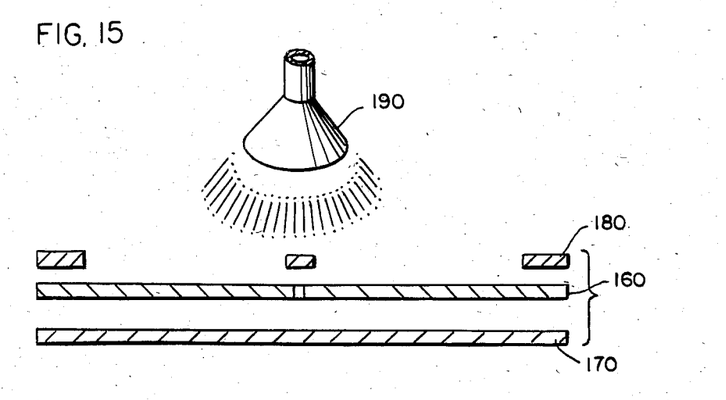
FIG. 15 is a side schematic view of the plate making machine with the photo negative of FIG. 14.
Figure 16:
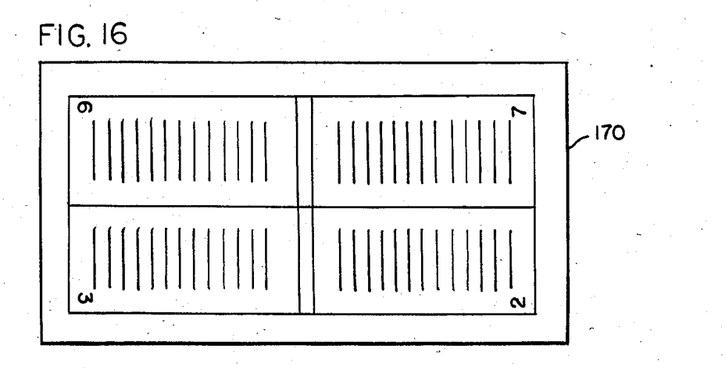
FIG. 16 is a top plan view of the plate made in accordance with the procedure of FIG. 15.

Referring to FIG. 15 then, a plate 170 is provided. The developed film 160 is positioned on top of the plate 170 and a mask 180 positioned over the film 160. A light source 190 will then cause an image to be formed on the plate 170 in a manner known to those skilled in the art. Again, the alignment of the plate 170, the film 160 and the mask 180 is properly maintained by use of indexing pins such as previously described. As a result of the use of the plate making machine schematically illustrated in FIG. 15, a final printing plate is provided as shown in FIG. 16. The plate 170 then has the appropriate image of the material to be printed. The image is arranged in proper order and sequence for the manufacture of an eight page signature wherein four pages are printed on the front of the signature sheet and four pages are printed on the back of the signature sheet. The plate 170 depicted by FIG. 16 is a plate 170 which is used to print the back side (1B) of the printed signature sheet associated with the eight page signature of the example. The other set (1F) is used to make another plate for the front side of the signature sheet.

FIG. 17 is a representative example of a series of tables for various sized works. FIG. 17 includes as its first entry a table for a single eight page signature work such as previously set forth in FIG. 9. Additionally, FIG. 17 includes the code and index information for works having 12, 16, 20, 24, etc. pages. The particular tables as shown in FIG. 17 provide for work and turn pages to be positioned in front of the eight page signature comprising the work. Also, the table of FIG. 17 is designed for eight page signatures having one front and one back plate, i.e. four pages per plate. Note that in each instance in the table set forth that the sum of the four page numbers which comprise a set for the film making step is 2N+2 with N equaling the number of pages in the work. This technique provides for an internal check of the tables which are set forth in FIG. 17.

In review, the particular arrangement of pages set forth in FIG. 17 contemplates that each signature will have eight pages. Thus, referring to the table for sixteen pages, there will be two eight-page signatures. The first signature will include two sets represented by the nomenclature "1F" and "1B". Each set will comprise four pages defined by a four page negative. The second signature is represented by the nomenclature "2F" and "2B" again indicating two sets of four pages each. Thus, FIG. 17 represents the particular film processing and page arrangement which is necessary to prepare eight page signatures which would then be combined to provide a work which is a multiple number of pages, such as sixteen, twenty and the like.

It is possible, of course, to provide tables for signatures of any page size, for example, sixteen page signatures. It is also possible to provide for tables wherein the work and turn signatures would be in the middle of the work rather than at the front as in FIG. 17. Other permutations and combinations of pages are possible depending upon the various factors previously discussed.

It is possible to practice the invention for a publication having any number of pages and made of signatures of various sizes and numbers of pages. Other variations may result due to the size of the press, the size of the photo processing equipment and other variables known in the printing arts. Thus, while there has been set forth a preferred embodiment of the invention, it is to be understood that the invention is to be limited only by the following claims and their equivalents.

What is claimed is:

1. A method for preparing printing plates using photographic techniques, said plates of the type for manufacture of a multiple page, bound publication, said method comprising, in combination the steps of:
   (a) preparing a serial set of page copy for a multiple page, bound publication;
   (b) mounting each page of the set on a separate index control sheet, each one of said control sheets including a code designation associated with the page number of the set, each one of said control sheets also including index mounting means for positioning the sheet on a photographic platen; and each of said control sheets also including indicia for aligning the page copy on the control sheet, said mounting step performed to place the serial page of copy on the corresponding index control sheet in a proper indexed orientation;
   (c) positioning a subset of index control sheets on a photographic platen by coordinating the code designations with a platen position and by placing the control sheet mounting means in cooperative relation with mounting means prepositioned on the platen;
   (d) preparing a photographic negative by photographing the copy positioned on the platen; and
   (e) preparing a printing plate directly from the photo negative using a photographic exposing apparatus.

2. The method of claim 1 including the step of mounting the photographic negative prior to exposure on preindexed mounting means juxtaposed at a proper focal distance from the subset, and further including the step of mounting the subsequently prepared photographic negative on substantially identical, preindexed mounting means of the photographic exposing apparatus whereby orientation and indexing of the subset on the platen is effective to index and register all copy for all the steps of the process.

3. A set of index control sheets for preparing printing plates for multipage publication comprising, in combination:

a plurality of associated, separate sheets of identical size and shape; each sheet in the series having means for providing a unique code indicia associated with each separate page of the publication and also having one of two alternate indexing patterns, one of said patterns associated with odd numbered pages of the publication and the other associated with even numbered pages, each of said sheets also including a page alignment portion for mounting and aligning a page of copy material relative to the associated indexing pattern.

4. The set of control sheets of claim 3 for a signature having an even number of pages.

5. The control sheets of claim 3 in combination with an indexing table having legends for marking the control sheets in sets for preparation of multipage film negatives useful for preparation of a printing plate.

* * * * *